United States Patent
White et al.

(10) Patent No.: US 9,933,337 B2
(45) Date of Patent: Apr. 3, 2018

(54) WHEEL END SENSOR FOR HEAVY-DUTY VEHICLES

(71) Applicant: HENDRICKSON USA, L.L.C., Itasca, IL (US)

(72) Inventors: Jay D. White, Massillon, OH (US); Jeffrey S. Morris, Canton, OH (US); Keith M. Ernenwein, North Canton, OH (US); Matthew Karich, Fairlawn, OH (US); Jeffrey R. Zawacki, Channahon, IL (US)

(73) Assignee: Hendrikson USA, L.L.C., Itasca, IL (US)

( * ) Notice: Subject to any disclaimer, the term of this patent is extended or adjusted under 35 U.S.C. 154(b) by 329 days.

(21) Appl. No.: 14/851,080

(22) Filed: Sep. 11, 2015

(65) Prior Publication Data

US 2016/0076973 A1 Mar. 17, 2016
US 2017/0276570 A9 Sep. 28, 2017

Related U.S. Application Data

(60) Provisional application No. 62/049,452, filed on Sep. 12, 2014.

(51) Int. Cl.
*G01M 17/013* (2006.01)
*B60T 17/22* (2006.01)
(Continued)

(52) U.S. Cl.
CPC ......... *G01M 17/013* (2013.01); *B60B 7/0013* (2013.01); *B60C 23/001* (2013.01); *B60T 17/22* (2013.01)

(58) Field of Classification Search
CPC ....... B60C 23/12; B60C 23/001; B60C 23/02; G01M 17/013; B60T 17/22; B60B 7/0013
See application file for complete search history.

(56) References Cited

U.S. PATENT DOCUMENTS 3,645,479 A 2/1972 Kostroun et al.
4,536,668 A * 8/1985 Boyer ................... B60C 23/041
180/65.51
(Continued)

FOREIGN PATENT DOCUMENTS

EP 0999113 A1 5/2000
JP 2006194629 A 7/2006
(Continued)

*Primary Examiner* — Freddie Kirkland, III
(74) *Attorney, Agent, or Firm* — Dureska & Moore, LLC; David P. Dureska; Greg Strugalski

(57) ABSTRACT

A wireless sensor for a wheel end assembly of a heavy-duty vehicle is provided. The wheel end assembly includes a wheel hub and a hub cap mounted on the wheel hub. The sensor includes mounting means disposed in the hub cap. Sensing means are mounted on the mounting means to sense at least one condition of the vehicle. A processor is mounted on the mounting means and is electrically connected to the sensing means to process data from the sensing means. Communication means are mounted on the mounting means and are electrically connected to the processor to communicate the processed data to a user. An electrical energy storage device is mounted on the mounting means and is electrically connected to the sensing means, the processor and the communication means, enabling the sensor to be independent from the vehicle power supply. The sensor also accommodates components of a tire inflation system.

25 Claims, 11 Drawing Sheets

(51) Int. Cl.
*B60C 23/00* (2006.01)
*B60B 7/00* (2006.01)

(56) References Cited

U.S. PATENT DOCUMENTS

| | | | |
|---|---|---|---|
| 4,893,877 A | 1/1990 | Powell et al. | |
| 5,184,069 A | 2/1993 | Adler et al. | |
| 5,505,080 A * | 4/1996 | McGhee | B60C 23/004 116/34 R |
| 5,959,365 A | 9/1999 | Mantini et al. | |
| 6,011,463 A * | 1/2000 | Cormier, Sr. | B60C 23/0433 340/442 |
| 6,046,672 A * | 4/2000 | Pearman | B60C 23/0408 340/442 |
| 6,538,426 B1 | 3/2003 | Enrietto et al. | |
| 6,675,640 B2 | 1/2004 | Ehrlich et al. | |
| 6,742,386 B1 * | 6/2004 | Larson | B60C 23/004 340/447 |
| 6,776,261 B2 * | 8/2004 | Eriksen | F16C 19/52 184/6.4 |
| 6,892,778 B2 * | 5/2005 | Hennig | B60C 23/003 152/415 |
| 7,209,032 B2 * | 4/2007 | Fennel | B60C 23/043 340/442 |
| 7,272,536 B2 | 9/2007 | Potts | |
| 7,403,103 B2 * | 7/2008 | Pearman | B60C 23/041 340/444 |
| 7,640,139 B2 | 12/2009 | Sahara et al. | |
| 7,821,950 B2 | 10/2010 | Murata et al. | |
| 7,860,663 B2 | 12/2010 | Miyasaka et al. | |
| 8,125,323 B2 * | 2/2012 | Stephan | B60C 23/0408 116/34 R |
| 8,159,364 B2 | 4/2012 | Zeine | |
| 8,223,006 B2 * | 7/2012 | Wilson | B60C 23/003 301/5.1 |
| 8,410,953 B2 | 4/2013 | Zeine | |
| 8,446,248 B2 | 5/2013 | Zeine | |
| 8,534,128 B2 | 9/2013 | Murayama | |
| 8,558,661 B2 | 10/2013 | Zeine | |
| 8,690,441 B2 * | 4/2014 | Heim | B60B 27/001 384/448 |
| 9,221,308 B2 * | 12/2015 | Nelson | B60C 29/00 |
| 9,389,149 B2 * | 7/2016 | Paulin | B60B 3/165 |
| 2003/0221911 A1 | 12/2003 | Eriksen et al. | |
| 2005/0084987 A1 | 4/2005 | Wilson et al. | |
| 2005/0085987 A1 * | 4/2005 | Yokota | B60C 23/0477 701/80 |
| 2005/0251996 A1 | 11/2005 | Vencill | |
| 2009/0284362 A1 | 11/2009 | Wilson et al. | |
| 2010/0256874 A1 | 10/2010 | Carresjo et al. | |
| 2010/0256946 A1 | 10/2010 | Carresjo et al. | |
| 2010/0274441 A1 | 10/2010 | Carresjo et al. | |
| 2010/0274607 A1 | 10/2010 | Carresjo et al. | |
| 2010/0289271 A1 | 11/2010 | DiMauro et al. | |
| 2011/0029156 A1 | 2/2011 | Vernacchia et al. | |
| 2011/0114404 A1 | 5/2011 | Lee | |
| 2011/0168465 A1 | 7/2011 | Starr | |
| 2011/0168466 A1 | 7/2011 | Starr | |
| 2012/0067654 A1 | 3/2012 | Carabelli et al. | |

FOREIGN PATENT DOCUMENTS

| | | |
|---|---|---|
| JP | 2007170815 A | 7/2007 |
| JP | 2007278894 A | 10/2007 |
| JP | 2007278895 A | 10/2007 |
| JP | 2013003095 A | 1/2013 |

* cited by examiner

WHEEL END SENSOR FOR HEAVY-DUTY VEHICLES

CROSS-REFERENCE TO RELATED APPLICATIONS

This application claims the benefit of U.S. Provisional Patent Application Ser. No. 62/049,452, which was filed on Sep. 12, 2014.

BACKGROUND OF THE INVENTION

Technical Field

The invention relates to sensors for wheel end assemblies, and in particular to sensors for wheel end assemblies of heavy-duty vehicles, such as tractor-trailers. More particularly, the invention is directed to a wireless sensor for a wheel end assembly of a heavy-duty vehicle, which is mounted in a hub cap of the wheel end assembly. The sensor is thus located in a protected, yet easily-accessible environment, is independent from the vehicle power supply, and detects operating conditions of the heavy-duty vehicle, such as temperature, vibration, moisture, and/or other parameters. The sensor includes convenient indicating means, while being capable of accommodating components of a tire inflation system.

Background Art

For many years, the heavy-duty vehicle industry has utilized wheel end assemblies which are mounted on each end of one or more axles. Each wheel end assembly typically includes a wheel hub rotatably mounted on a bearing assembly that in turn is immovably mounted on the outboard end of the axle, commonly known as an axle spindle. The bearing assembly includes an inboard bearing and an outboard bearing, which may be separated by a bearing spacer. An axle spindle nut assembly secures the bearing assembly on the axle spindle by threadably engaging threads that are cut into the outer diameter of the outboard end of the axle spindle. In addition to retaining the position of the bearings and any spacer, the axle spindle nut assembly may be used to provide a clamp force to compress the bearings, and any bearing spacer, to a predetermined level.

As is well known to those skilled in the art, for normal operation of the wheel end assembly to occur, the bearing assembly and surrounding components must be lubricated with grease or oil. Therefore, the wheel end assembly also must be sealed to prevent leakage of the lubricant, and also to prevent contaminants from entering the assembly, both of which could be detrimental to its performance. More specifically, a hubcap is mounted on an outboard end of the wheel hub adjacent to and outboard from the axle spindle nut assembly, and a main seal is rotatably mounted on an inboard end of the hub and the bearing assembly in abutment with the axle spindle, resulting in a closed or sealed wheel end assembly.

While most wheel end assemblies include these general features, the design and arrangement of the hub, bearing assembly, hubcap, main seal, and other components, as well as the axle spindle, vary according to the specific vehicle design and its anticipated uses. In addition, it has been desirable to sense and monitor operating conditions of the wheel end assembly in order to determine if issues with any of the wheel end assembly components have arisen. For example, it has been desirable to monitor the temperature of the wheel end assembly, as a consistently high temperature may indicate a lack of lubricant or improper functioning of the bearing assembly. It has also been desirable to monitor the vibration experienced in the wheel end assembly, as a consistently high level of vibration may also indicate improper functioning of the bearing assembly.

In the event that undesirable levels of the sensed operating conditions occurs, it may be possible to stop operation of the vehicle and/or perform maintenance on the vehicle to repair or replace problematic wheel end components before failure of those components takes place. When failure of a wheel end component occurs, there may be damage to surrounding components, which greatly increases the cost and the time to repair the wheel end assembly. Thus, when the vehicle can be stopped and/or components can be replaced before failure occurs, it may be possible to significantly reduce the cost and the time that is required to repair the wheel end assembly.

In the prior art, sensors for wheel end assemblies have been employed, but possess certain disadvantages. For example, some prior art sensors were externally mounted, that is, mounted on the outside of a wheel of the wheel end assembly. Because the exterior of a wheel end assembly experiences extremely harsh conditions during operation of the vehicle, such as road hazards and corrosive anti-icing chemicals, the externally-mounted sensors have been undesirably prone to significant damage. In addition, externally-mounted sensors are subject to rough handling during disassembly and reassembly of the wheel end assembly for servicing, which may also damage the sensor.

As an alternative, other prior art sensors have been mounted inside of the wheel end assembly. However, it is necessary for the sensor to communicate or otherwise transmit the data for the conditions that are being monitored, which is difficult to do from inside a wheel end assembly. More particularly, the rotation of the wheel hub about the axle spindle and the significant amount of metal employed in the hub, spindle, bearings, and other components, interferes with wireless signal transmission. As a result, many internally-mounted sensors have used wires that extend inside the axle to transmit data. Because such wires must travel through areas of the vehicle that are exposed to corrosive elements, the wires often corrode easily, which undesirably disables communication from the sensor. Such wires are also subject to scuffing and physical wear from vibration experienced during operation of the vehicle, which may undesirably cause the wires to short out.

Many prior art sensors that have been mounted inside of the wheel end assembly are electrically connected to the vehicle power supply and thus depend upon the vehicle power supply to operate. For example, in the case of a tractor-trailer, prior art sensors have been connected to the tractor power supply. It is known in the art that connections to the vehicle power supply often encounter difficulty in adequately providing sufficient power on a consistent basis to enable a sensor to operate, due to the harsh environment surrounding the connection of the sensor to the vehicle power supply. As a result, such prior art sensors have experienced difficulty in maintaining a desired ability to continuously operate while the vehicle is traveling.

In addition, many prior art sensors that have been mounted inside of a wheel end assembly are not easily accessible. In the event that such a sensor needs to be adjusted, repaired, or replaced, the sealed wheel end assembly must be opened and sometimes partially disassembled to access the sensor. Opening and partially disassembling a sealed wheel end assembly is undesirable, as contaminants may enter the wheel end assembly, which may reduce the performance and/or life of the wheel end assembly. Also, due to the precise requirements for proper assembly of wheel end components, any disassembly that is needed to access a sensor is undesirable, as it is possible for components to be re-assembled in an inferior manner, which again reduces the performance and/or life of the wheel end assembly.

Moreover, the space that is available inside of a wheel end assembly for a sensor or other components is extremely limited. Many prior art sensors that have been mounted inside of a wheel end assembly take up a significant amount of space, which often interferes with or prevents the installation of other components, such as components of a tire inflation system. Because tire inflation systems provide advantages associated with automatic monitoring and control of tire pressure through methods and structures that are known in the art, it is desirable to accommodate components of tire inflation systems.

Such disadvantages of the prior art make it desirable to develop a sensor for a wheel end assembly of a heavy-duty vehicle that is mounted in a protected environment, is independent from the vehicle power supply, includes wireless data communication or transmission, is easily accessed for servicing, provides effective and efficient means for communicating or transmitting data, and accommodates components of a tire inflation system. The present invention satisfies these needs, as will be described below.

BRIEF SUMMARY OF THE INVENTION

An objective of the present invention is to provide a sensor for a wheel end assembly of a heavy-duty vehicle that is mounted in a protected environment.

Another objective of the present invention is to provide a sensor for a wheel end assembly of a heavy-duty vehicle that is independent from the vehicle power supply.

Still another objective of the present invention is to provide a sensor for a wheel end assembly of a heavy-duty vehicle that includes wireless data communication or transmission.

Yet another objective of the present invention is to provide a sensor for a wheel end assembly of a heavy-duty vehicle that is easily accessed for servicing.

Still another objective of the present invention is to provide a sensor for a wheel end assembly of a heavy-duty vehicle that provides effective and efficient means for communicating or transmitting data.

Yet another objective of the present invention is to provide a sensor for a wheel end assembly of a heavy-duty vehicle that accommodates components of a tire inflation system.

These objectives and others are obtained by the sensor for a wheel end assembly of a heavy-duty vehicle of the present invention. In an exemplary embodiment of the invention, the wheel end assembly includes a wheel hub and a hub cap removably mounted on the wheel hub. The sensor includes mounting means disposed in the hub cap. Sensing means are mounted on the mounting means to sense at least one operational condition of the vehicle. A processor is mounted on the mounting means and is electrically connected to the sensing means to process data from the sensing means. Communication means are mounted on the mounting means and are electrically connected to the processor to communicate the processed data to a user. An electrical energy storage device is mounted on the mounting means and is electrically connected to the sensing means, the processor and the communication means to power the sensor.

BRIEF DESCRIPTION OF THE SEVERAL VIEWS OF THE DRAWINGS

The preferred embodiments of the present invention, illustrative of the best modes in which Applicant has contemplated applying the principles, are set forth in the following description and are shown in the drawings, and are particularly and distinctly pointed out and set forth in the appended claims.

Similar numerals refer to similar parts throughout the drawings.

DETAILED DESCRIPTION OF THE INVENTION

The present invention is directed to a wireless sensor for a wheel end assembly of a heavy-duty vehicle. The sensor is mounted in a hub cap of the wheel end assembly and thus is disposed in a protected environment, while being easily accessed for adjustment, repair, and/or replacement. The sensor is independent from the vehicle power supply, detects and monitors operating conditions such as temperature, vibration, moisture, and/or other parameters, and includes convenient means for communicating or transmitting the sensed data. These means include light emitting diode (LED) readouts that are displayed through an optionally translucent sight glass of the hub cap, and/or optional radio frequency (R/F) transmission to a relay or a central source. The sensor is configured and mounted in a manner that accommodates components of a tire inflation system. The sensor may be battery powered, or may be powered by alternate means such as energy harvesting.

Figure 1:
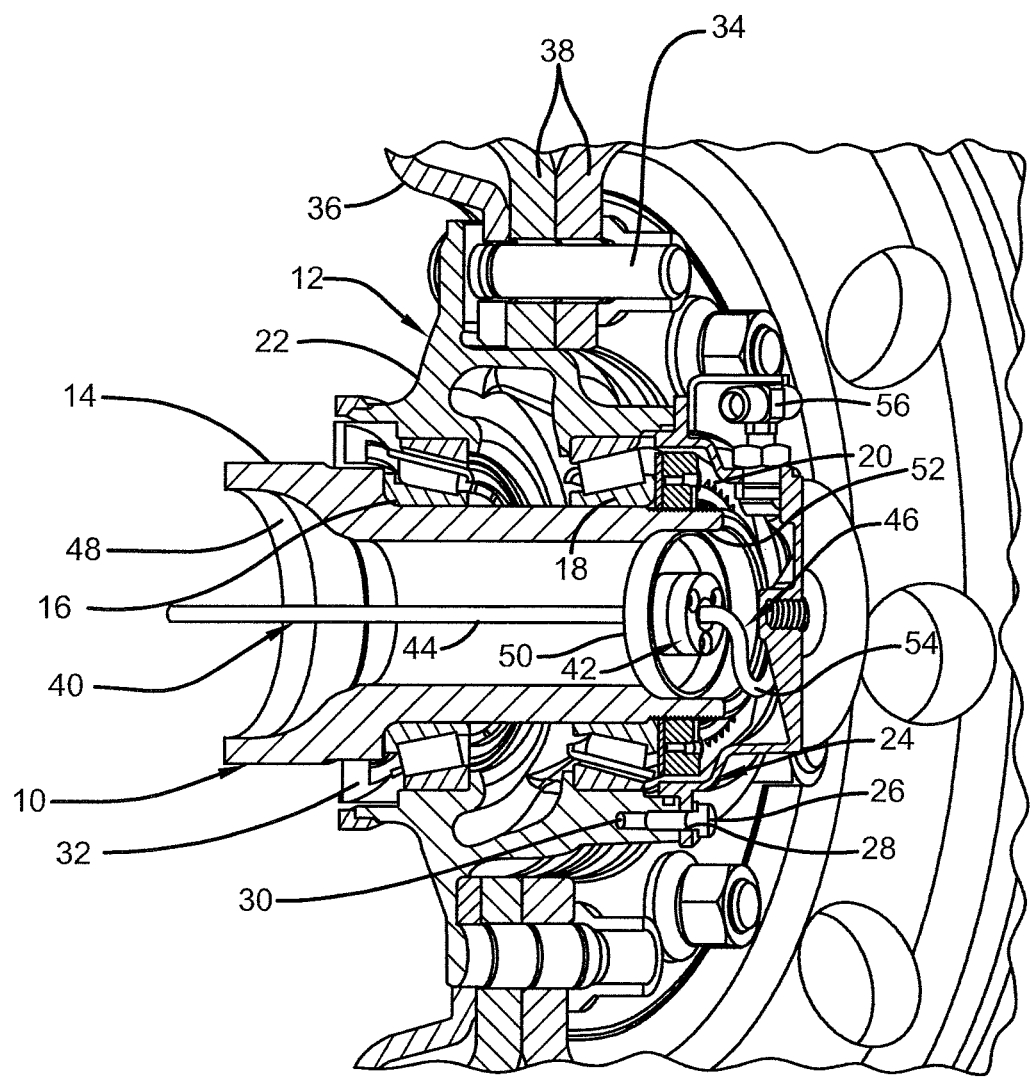
FIG. 1 is fragmentary cross-sectional perspective view of a portion of a prior art axle spindle and a wheel end assembly, with a prior art tire inflation system shown installed on the axle and wheel end assembly.

In order to better understand the sensor for the wheel end assembly of a heavy-duty vehicle of the present invention and the environment in which it operates, the components of an exemplary wheel end assembly and a prior art tire inflation system are shown in FIG. 1, and now will be described.

One or more axles 10 typically depend from and extend transversely across a heavy-duty vehicle (not shown). Each axle 10 has two ends, with a wheel end assembly 12 mounted on each one of the ends. For the purposes of convenience and clarity, only one end of axle 10 and its respective wheel end assembly 12 will be described herein. In addition, axle 10 is shown by way of example in FIG. 1 as a non-drive axle, with the understanding that the present invention applies to all types of axles known in the art, including drive axles and non-drive axles. Moreover, heavy-duty vehicles include trucks and tractor-trailers or semi-trailers, and the tractor-trailers or semi-trailers typically are equipped with one or more trailers. Reference herein shall be made generally to a heavy-duty vehicle for the purpose of convenience, with the understanding that such reference includes trucks, tractor-trailers and semi-trailers, and trailers thereof.

Axle 10 includes a central tube (not shown), and an axle spindle 14 is integrally connected, by any suitable means such as welding, to each end of the central tube. Wheel end assembly 12 includes a bearing assembly having an inboard bearing 16 and an outboard bearing 18 immovably mounted on the outboard end of axle spindle 14. A spindle nut assembly 20 threadably engages the outboard end of axle spindle 14 and secures bearings 16, 18 in place. A wheel hub 22 is rotatably mounted on inboard and outboard bearings 16, 18 in a manner well known to those skilled in the art.

A hub cap 24 is mounted on the outboard end of hub 22 by a plurality of bolts 26, each one of which passes through a respective one of a plurality of openings 28 formed in the hub cap, and threadably engages a respective one of a plurality of aligned threaded openings 30 formed in the hub. In this manner, hub cap 24 closes the outboard end of wheel end assembly 12. A main continuous seal 32 is rotatably mounted on the inboard end of wheel end assembly 12 and closes the inboard end of the assembly. In a typical heavy-duty vehicle dual-wheel configuration that employs drum brakes, a plurality of threaded bolts 34 are used to mount a brake drum 36 and a pair of wheel rims 38 on wheel end assembly 12. Each one of a pair of tires (not shown) is mounted on a respective one of wheel rims 38, as known in the art. Of course, disc brakes (not shown) rather than drum brakes may be mounted on wheel end assembly 12 in a manner known to those skilled in the art without affecting the overall concept or operation of the invention.

A prior art tire inflation system is indicated generally at 40. A central bore 48 is formed in axle 10, through which a pneumatic conduit 44 of tire inflation system 40 extends toward an outboard end of axle spindle 14. Pneumatic conduit 44 is fluidly connected to and extends between the vehicle air supply, such as an air tank (not shown), and a rotary union 42. Rotary union 42 is attached to a plug 50 that is press-fit in a machined counterbore 52 formed in axle central bore 48 at an outboard end of axle spindle 14, and as known in the art, facilitates the connection of static pneumatic conduit 44 to an air tube assembly 46, which rotates with the tire.

Air tube assembly 46 includes a first tube 54 that is fluidly connected at one of its ends to rotary union 42 inside hub cap 24, and is fluidly connected at the other of its ends to a tee fitting 56, which passes through the hub cap and is secured to the hub cap. Additional air tubes (not shown) are fluidly connected to and extend from each one of two outlets of tee fitting 56 outside of hub cap 24 to each one of a respective pair of tires mounted on rims 38. In this manner, air passes from the vehicle air tank, through pneumatic conduit 44, rotary union 42, first air tube 54, hub cap 24 and tee fitting 56, and to the tires.

As described above, it has been desirable to sense and monitor operating conditions of wheel end assembly 12, such as temperature, vibration, moisture, and/or other parameters in order to determine if issues with any of the wheel end components have arisen. In the prior art, some sensors were externally mounted on hub 22 or wheel rims 38, and were undesirably prone to damage due to the extremely harsh conditions experienced during operation of the vehicle, or due to rough handling during disassembly and reassembly of wheel end assembly 12 for servicing.

Other prior art sensors were mounted inside of wheel end assembly 12, but experienced other disadvantages. For example, some internally-mounted prior art sensors have depended on the vehicle power supply, which often encounters difficulty providing sufficient power on a consistent basis. Also, due to the difficulty of providing a wireless signal transmission from the inside of wheel end assembly 12, such internally-mounted sensors employed wires, which often corroded easily or shorted out due to scuffing from vibration. In addition, such internally-mounted sensors were not easily accessible, creating potential issues with contamination or inferior re-assembly of wheel end assembly 12 when such sensors were accessed for adjustment, repair, or replacement. Moreover, many prior art internally-mounted sensors have taken up a significant amount of space inside wheel end assembly 12, which has undesirably interfered with accommodation of components of tire inflation system 40.

Therefore, it has been desirable to develop a sensor for a wheel end assembly of a heavy-duty vehicle that is mounted in a protected environment, is independent from the vehicle power supply, includes wireless data communication or transmission, is easily accessed for servicing, provides effective and efficient means for communicating or transmitting data, and accommodates components of a tire inflation system. The present invention satisfies these needs, as will now be described.

Figure 2:
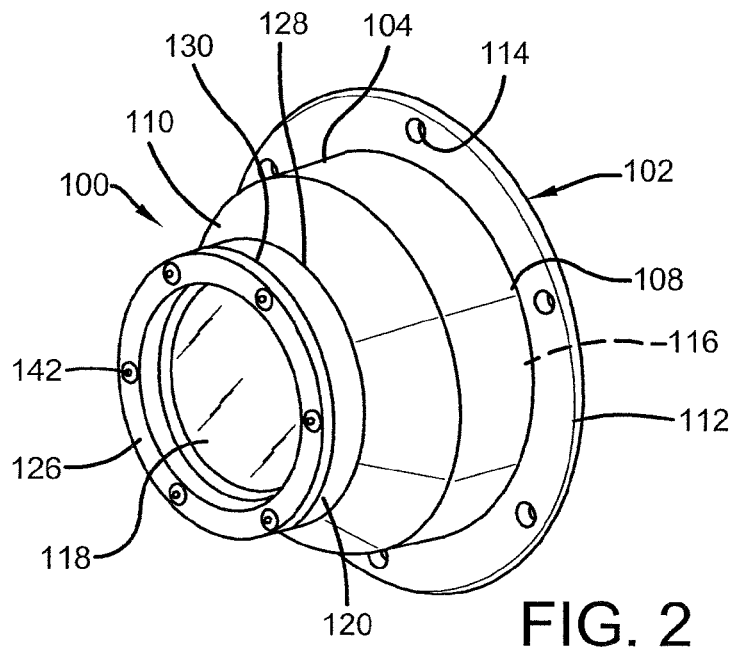
FIG. 2 is an enlarged perspective view from an outboard end of a first exemplary embodiment of the sensor for a heavy-duty wheel end assembly of the present invention shown mounted in a hub cap.
Figure 3:
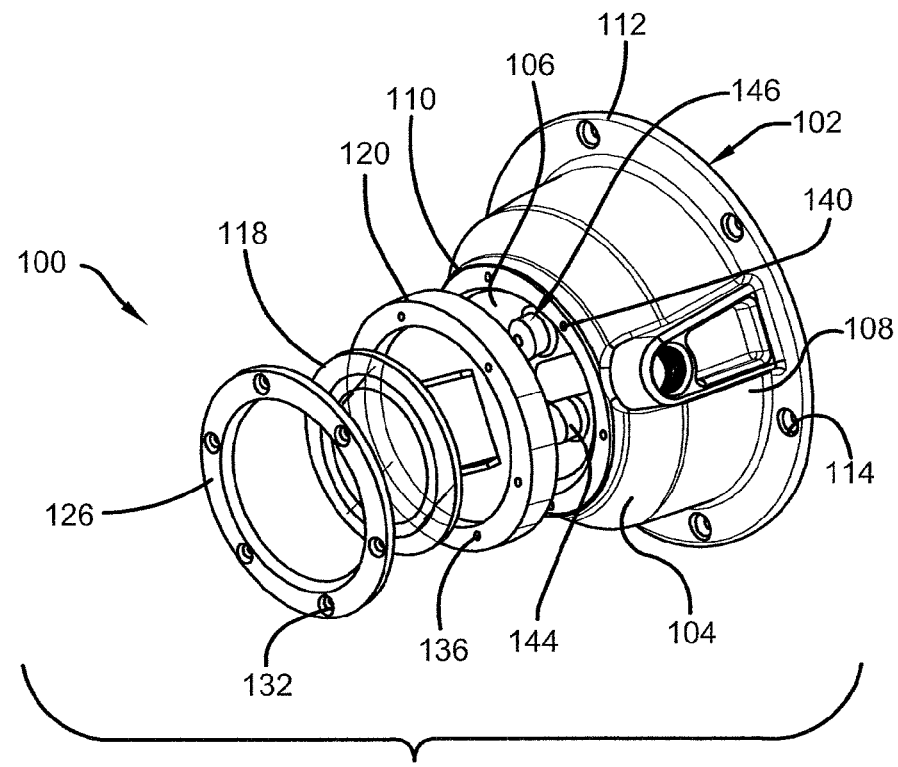
FIG. 3 is an exploded perspective view of the components shown in FIG. 2.
Figure 4:
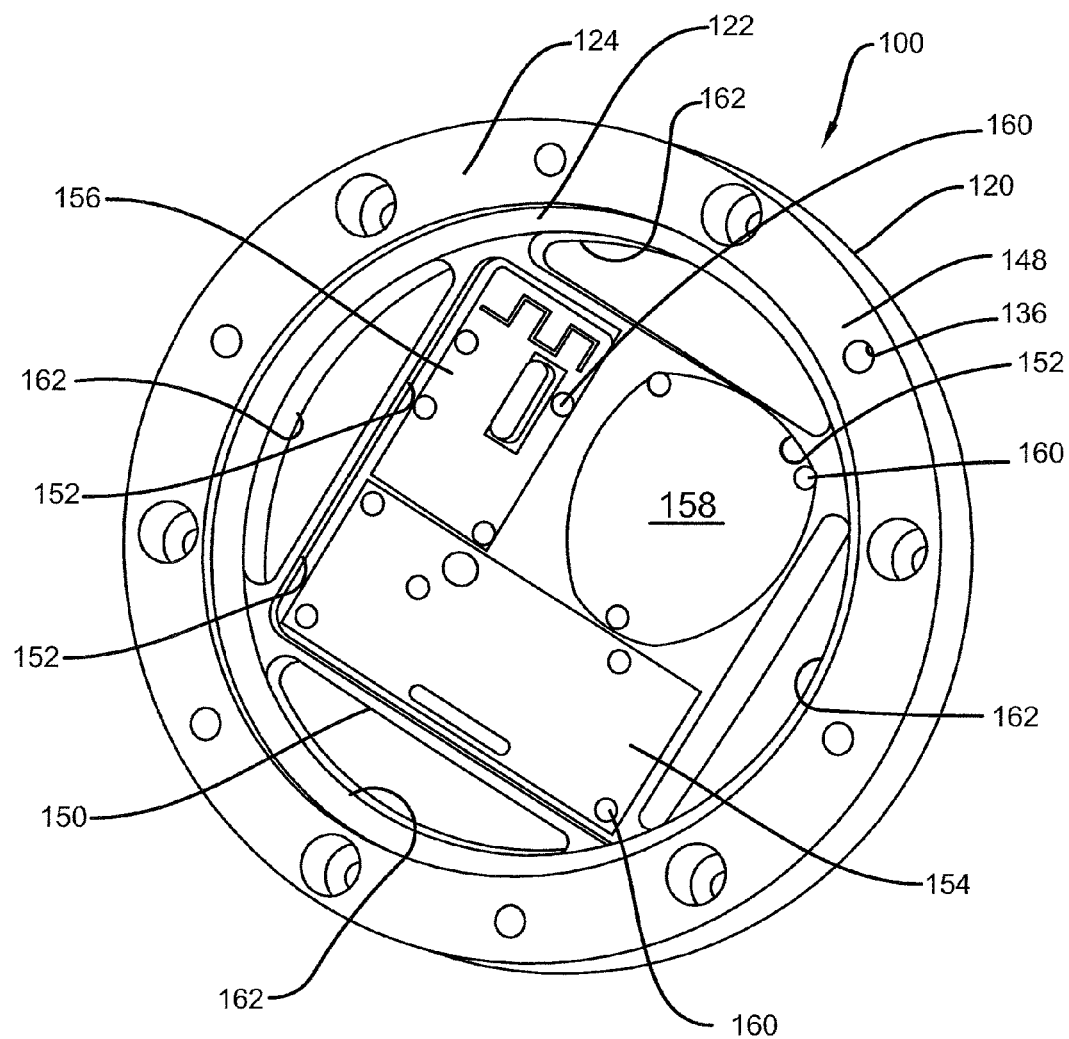
FIG. 4 is a greatly enlarged perspective view of the sensor shown in FIG. 2 disposed in a preferred mounting configuration.

Turning now to FIGS. 2-4, a first exemplary embodiment of the sensor for a wheel end assembly of a heavy-duty vehicle is indicated generally at 100. Sensor 100 is mounted in a hub cap 102. Hub cap 102 includes a cylindrical side wall 104. A hub cap intermediate wall 106 is integrally formed between an inboard end 108 of side wall 104 and an outboard end 110 of the side wall, and preferably nearer to the outboard end of the side wall, and extends generally perpendicular to the side wall. It is to be understood that other shapes and configurations of hub cap side wall 104 and intermediate wall 106 may be employed without affecting the overall concept or operation of the present invention, such as an integrated dome or cone shape formed as one piece or multiple pieces, and/or adjusting the intermediate wall to be an outboard wall.

A radially-extending flange 112 is formed on inboard end 108 of side wall 104, and is formed with a plurality of bolt openings 114 to enable bolts 26 (FIG. 1) to secure hub cap 102 to the outboard end of wheel hub 22 (FIG. 1). In this manner, hub cap 102 defines an interior compartment 116. It is to be understood that means known to those skilled in the art other than bolts 26 may be used to secure hub cap 102 to wheel hub 22, such as a threaded connection between the hub cap and wheel hub, other types of mechanical fasteners, and/or a press fit.

Hub cap 102 also includes a discrete outboard wall 118. Sensor 100 includes a sensor block 120, which will be described in greater detail below. Sensor block 120 is disposed between hub cap outboard wall 118 and intermediate wall 106. Outboard wall 118 seats in a circumferentially-extending groove 122 formed in an outboard side 124 of sensor block 120. Outboard wall 118 is secured in groove 122 by a retaining ring 126. A fluid seal is provided between sensor block 120 and intermediate wall 106 by a first gasket 128 that is disposed between the sensor block and outboard end 110 of hub cap side wall 104. A fluid seal is provided between outboard wall 118 and retaining ring 126 by a second gasket 130, which is disposed between the outboard wall and the retaining ring. Retaining ring 126 is formed with openings 132, second gasket 130 is formed with openings (not shown), sensor block 120 is formed with openings 136, first gasket 128 is formed with openings (not shown), and outboard end 110 of side wall 104 is formed with openings 140. Aligned ones of openings 132, 136, 140, the first gasket openings, and the second gasket openings receive bolts or other mechanical fasteners 142 to secure retaining ring 126, second gasket 130, sensor block 120, and first gasket 128 to hub cap side wall 104.

Preferably, outboard wall 118 is transparent or translucent to enable visual inspection of sensor 100, as will be described in greater detail below. It is to be understood that hub cap 102 preferably integrates valves 144 and other components of a tire inflation system 146. An exemplary tire inflation system 146 is shown and described in U.S. patent application Ser. No. 13/194,617, which is owned by the same Assignee as the present invention, Hendrickson USA, L.L.C.

With particular reference now to FIG. 4, sensor 100 includes mounting means such as a sensor block 120. Sensor block 120 is preferably formed of a lightweight rigid material, such as aluminum. Sensor block 120 includes a perimeter ring 148, which includes openings 136 that receive bolts 142 (FIG. 2) that secure the sensor block to hub cap side wall 104 as described above. Integrally formed inside of perimeter ring 148 is a component mounting block 150, which is formed with a plurality of different sized and shaped recesses 152 for receiving components of sensor 100.

More particularly, recesses 152 receive a main circuit board 154, a radio frequency (R/F) circuit board 156, and an electrical energy storage device 158, such as a battery. For the purpose of convenience, reference in first embodiment sensor 100 to electrical energy storage device 158 shall be to a battery, although other types of electrical energy storage devices are contemplated in the present invention, as will be described in greater detail below. Battery 158 preferably is a replaceable battery, but may also be a non-replaceable battery, or two or more batteries that are electrically connected to one another to form a single power source. Main circuit board 154 includes sensor instrumentation that senses operational conditions and generates data signals, as will be described in greater detail below. Main circuit board 154 also includes processors that receive the data signals from the sensor instrumentation and collect and process the sensed data. R/F circuit board 156 is electrically connected by wires (not shown) to main circuit board 154, and enables wireless transmission of the sensed data, as will also be described in greater detail below. Battery 158 is electrically connected by wires (not shown) to main circuit board 154 and R/F circuit board 156 to provide power to the main circuit board and the R/F circuit board. Fasteners 160 secure main circuit board 154, R/F circuit board 156, and battery 158 in recesses 152 of mounting block 150.

Sensor block 120 is also formed with slots 162 between perimeter ring 148 and mounting block 150, which enable lubricant in wheel end assembly 12 (FIG. 1) to circulate through hub cap 102 and to be viewed through hub cap outboard wall 118, which preferably also acts as a sight glass. For example, as described above, hub cap outboard wall 118 preferably is transparent or translucent, and may be clear for convenient visual inspection, or may be tinted, when oil is employed as a lubricant for wheel end assembly 12. When visual inspection of lubricant is not necessary, such as when grease or semi-fluid grease is employed as a lubricant for wheel end assembly 12, hub cap outboard wall 118 may instead be opaque.

As described above, main circuit board 154 includes sensor instrumentation that senses operational conditions and generates signals. The conditions or parameters that are sensed by the sensor instrumentation include: the temperature in wheel end assembly 12 (FIG. 1), as sustained temperatures above a predetermined level may indicate excessive bearing wear; vibration in the wheel end assembly, as excessive vibration may indicate excessive bearing wear; humidity in the wheel end assembly, which may indicate excess moisture that may damage components; wheel speed and direction; and/or the revolution count of wheel hub 22, which may be used to calculate the distance that the vehicle has traveled, based on tire size. Once the sensor instrumentation senses the desired conditions and generates data, processors on main circuit board 154 collect the data and process it. For example, the data may be processed to prepare it for communication to a remote or central location, and/or may be processed to detect an emergency condition that is used to actuate an alarm for the vehicle operator or personnel at a central location, as will be described in greater detail below.

With particular attention to vibration sensing, sensor 100 employs a unique method of vibration sensing. As described above, sensing of excessive vibration may detect excessive wear or other performance issues of inboard bearing 16 and/or outboard bearing 18. When bearings 16, 18 are experiencing excessive wear or other issues, they often emit high-frequency noise. In the prior art, vibration sensing employed amplification of any vibration and the frequency to detect specific items or aspects of the high-frequency noise. Sensor 100 instead employs overall detection of a high-frequency band for a broad spectrum review.

Once main circuit board 154 senses the desired conditions and collects and processes the sensed data, the data is communicated to a user. An option for communicating the data is to electronically connect main circuit board 154 by wires to R/F circuit board 156, which wirelessly transmits the data to a receiver (not shown). Wireless communication is preferred because sensor 100 is disposed in hub cap 102, which rotates during vehicle operation and is not conducive to the use of wires. Wireless transmission of data is readily accomplished by sensor 100 of the invention, because R/F circuit board 156 is adjacent hub cap outboard wall 118, which is preferably formed of a transparent or translucent material as described above, and thus allows radio signals to pass through it with minimal interference. In this manner, sensor 100 is disposed in a protected location inside hub cap 102, while also enabling effective wireless communication due to its positioning adjacent hub cap outboard wall 118.

Main circuit board 154 and R/F circuit board 156 may be configured to sense, collect, process, and/or communicate data for a number of operating conditions, as described above, or a few select conditions, such as only data that indicates an emergency condition, for example, an excessively high temperature. When emergency conditions are sensed, R/F circuit board 156 may transmit the data to a receiver that is visible to the vehicle operator so that the operator may stop the vehicle. In addition, data for standard operating conditions may be sensed, collected, processed, and then transmitted to a remote receiver to enable central collection and analysis. For example R/F circuit board 156 may transmit data to a computer or smartphone, which is programmed to receive the data and analyze it for trends that may indicate optimum time periods to perform preventive maintenance on wheel end assembly 12. Such data may be employed to compare data for different vehicles in a fleet to one another, or to compare the data from one wheel end assembly 12 on a vehicle to other wheel end assemblies on the same vehicle to determine if one assembly is performing differently from the others and may thus be experiencing a performance issue.

Figure 5:
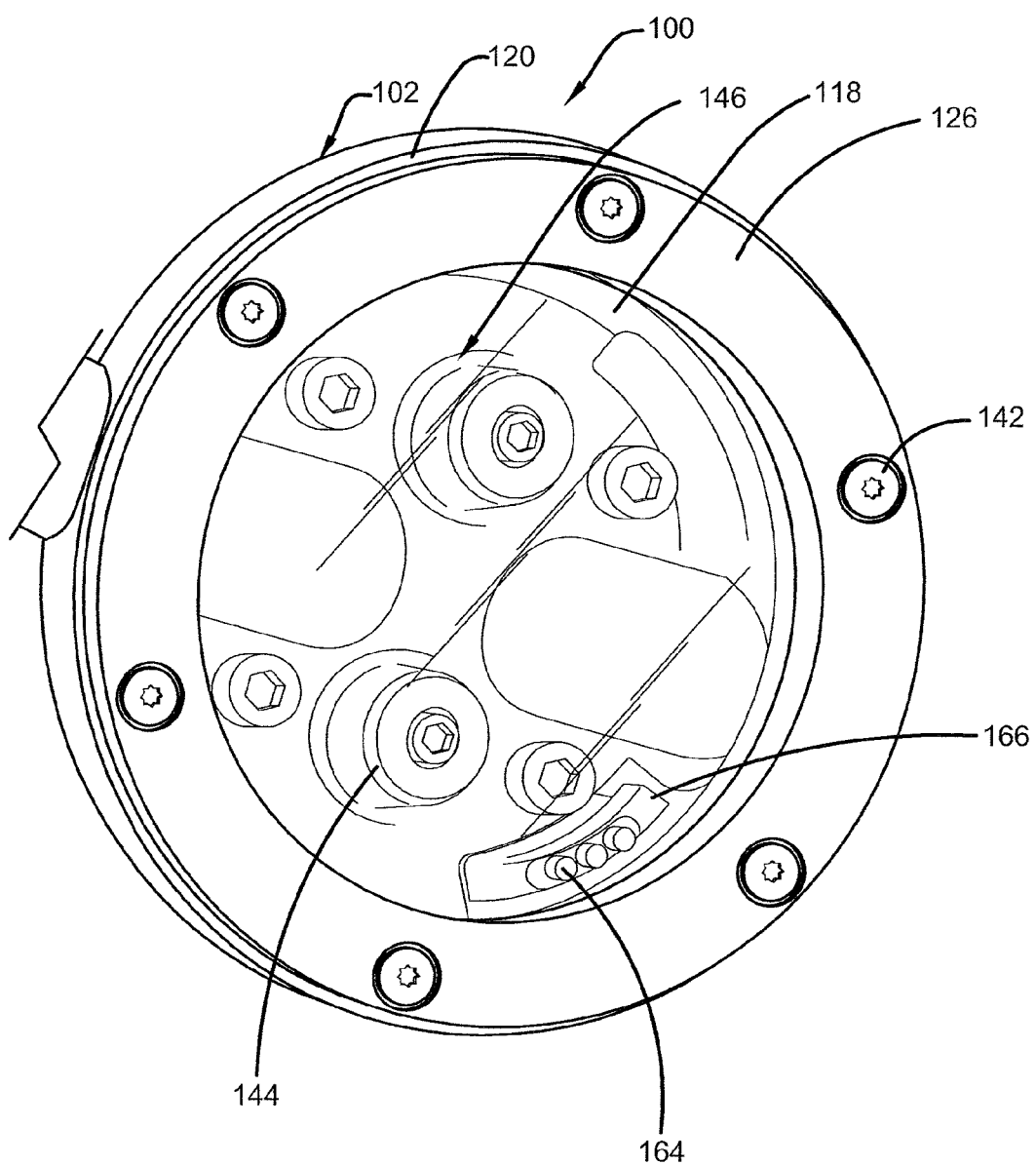
FIG. 5 is an enlarged fragmentary outboard end view of an optional visual indicator employed in the sensor for a heavy-duty wheel end assembly of the present invention.

With reference now to FIG. 5, in addition to wireless transmission, or as an optional replacement for wireless transmission, visual communication of sensed data may be employed by sensor 100. More particularly, sensor 100 may include light emitting diode (LED) indicators 164, which are mounted in an LED housing 166 that is in turn connected to mounting block 150 inside of perimeter ring 148. LED indicators 164 are electrically connected to main circuit board 154 by wires or electrical contacts. LED indicators 164 are oriented toward outboard wall 118 by LED housing 166, and because the outboard wall is preferably formed of a transparent or translucent material, the indicators are readily visible through the wall. LED indicators 164 may be configured to communicate data from an emergency condition that is sensed and processed by main circuit board 154 in a number of different manners. For example, LED indicators 164 may be configured to blink in patterns that indicate a specific emergency condition, such as an excessively high temperature in wheel end assembly 12, or the indicators may include different colors, so that certain color patterns indicate a specific emergency condition. In this manner, sensor 100 provides visual LED indicators 164 that remain in the protected and sealed environment of hub cap 102 and wirelessly communicate data for sensed conditions.

In addition to wireless transmission and/or visual communication, or as an optional replacement for wireless transmission and/or visual communication, an audible alert for sensed data may be employed by sensor 100. Such an audible alert preferably utilizes means known in the art that electronically connect to main circuit board 154 and sound an alarm for the vehicle operator to indicate a specific emergency condition, such as an excessively high temperature in wheel end assembly 12.

Sensor 100 thus provides a wireless sensor for wheel end assembly 12 for a heavy-duty vehicle. By being wireless and employing battery 158 for power, sensor 100 is independent from the vehicle power supply. Since sensor 100 is independent from the vehicle power supply, it is not subject to power-related difficulties arising from a connection to the vehicle power supply, and thus is able to continuously operate in a dependable manner while the vehicle is traveling. Sensor 100 is mounted in hub cap 102 of wheel end assembly 12, and by being disposed in a protected environment, is not subject to harsh environmental conditions, such as road debris and corrosive anti-icing chemicals. Sensor 100 also reduces potential damage from handling during disassembly and reassembly of wheel end assembly 12 for servicing.

In addition, by being mounted in hub cap 102, sensor 100 is tamper resistant. Because sensor 100 is mounted in sensor block 120 adjacent removable outboard wall 118 of hub cap 102, the sensor is easily accessed for adjustment, repair, and/or replacement, without substantially opening wheel end assembly 12, which desirably minimizes both the ability of contaminants to enter the wheel end assembly and the potential for improper re-installation of components. Sensor 100 includes effective means for communicating or transmitting data that is sensed, such as R/F transmission and/or LED indicators 164, which are disposed in the protected environment of hub cap 102 adjacent transparent or translucent outboard wall 118.

Moreover, sensor 100 is configured and mounted in a manner that accommodates components of tire inflation system 146. More particularly, because sensor block 120 is disposed between outboard wall 118 and intermediate wall 106 of hub cap 102, adequate space remains in the hub cap intermediate wall, hub cap side wall 104, and in hub cap compartment 116 for the mounting of components of tire inflation system 146. For example, a tire inflation system as shown and described in U.S. patent application Ser. No. 13/194,617, which is owned by the same Assignee as the present invention, Hendrickson USA, L.L.C., may readily be incorporated into hub cap 102.

It is to be understood that the above-described configuration of sensor block 120 is by way of example. Adaptations and adjustments to the configuration of sensor block 120 may be employed as known to those skilled in the art without affecting the overall concept or operation of the invention.

Figure 6:
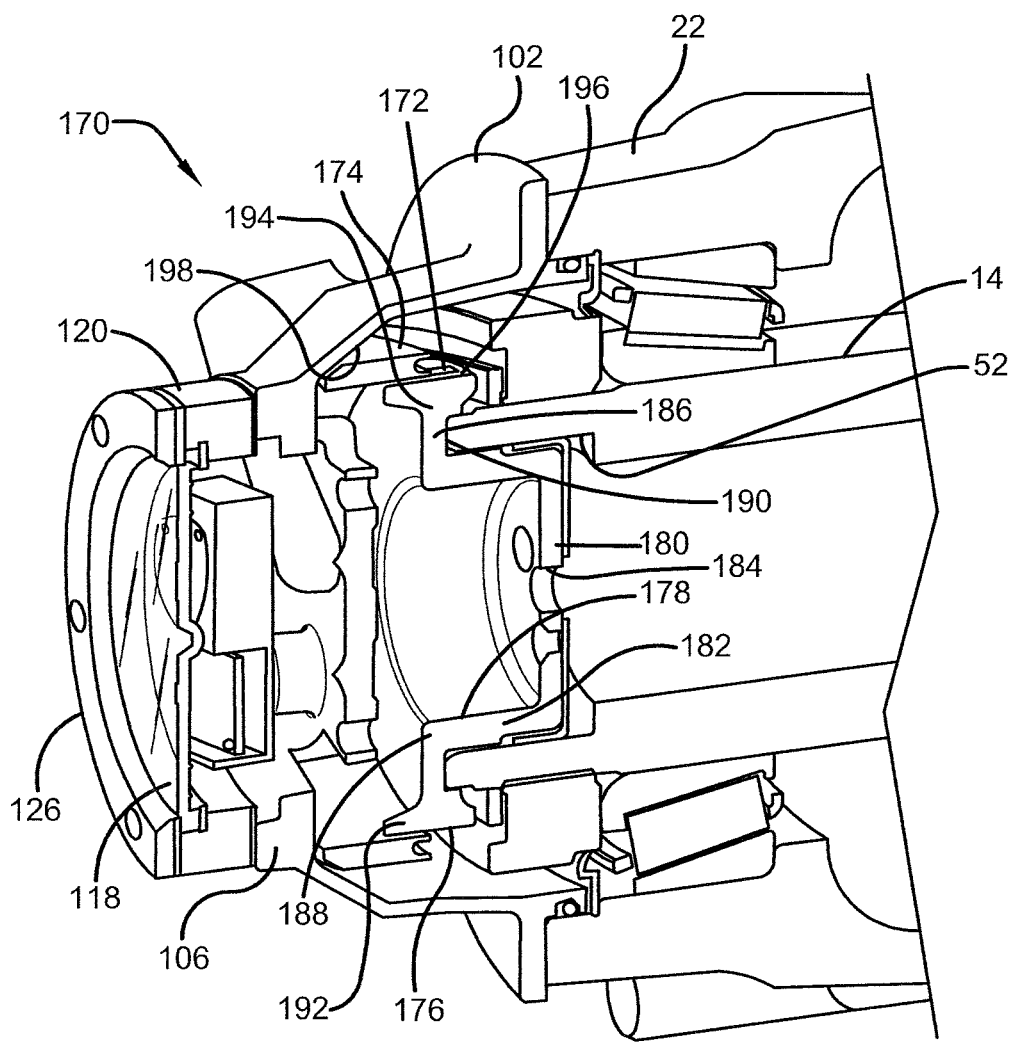
FIG. 6 is a fragmentary cross-sectional perspective view of a second exemplary embodiment of the sensor for a heavy-duty wheel end assembly of the present invention, shown mounted on an axle spindle and a wheel end assembly.
Figure 7:
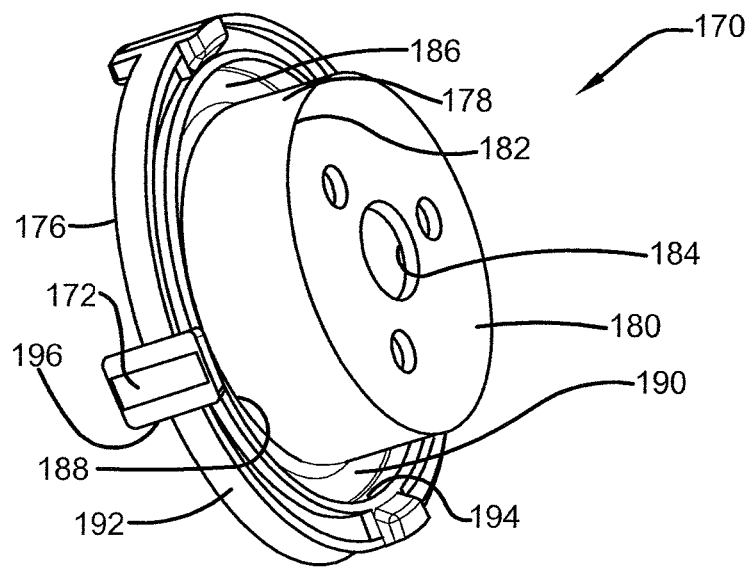
FIG. 7 is a perspective view from an inboard end of a spindle plug and magnets of the second embodiment of the sensor shown in FIG. 6.
Figure 8:
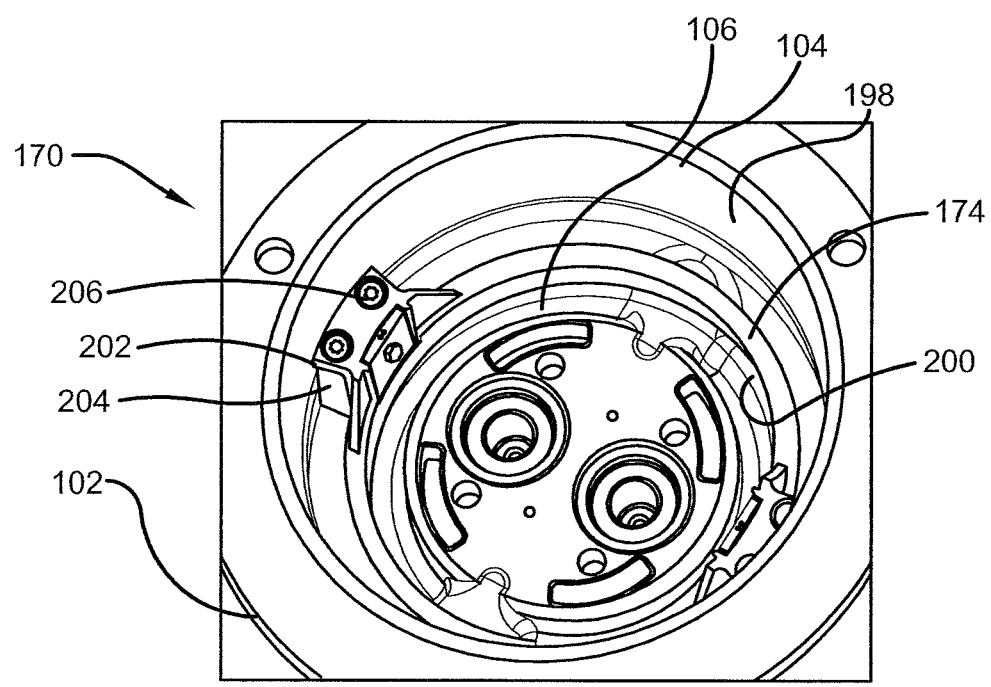
FIG. 8 is a fragmentary perspective view from an inboard end of the hub cap and a coil ring of the second embodiment of the sensor shown in FIG. 6.

Turning now to FIGS. 6-8, a second exemplary embodiment of the sensor for a wheel end assembly of a heavy-duty vehicle of the present invention is indicated at 170. Second embodiment sensor 170 finds application when it is desirable to employ energy harvesting to power electrical energy storage device 158, as will be described below. Second embodiment sensor 170 is similar in construction and operation to first embodiment sensor 100, with the exception that the second embodiment of the invention employs energy harvesting. As a result, only the differences between second embodiment sensor 170 and first embodiment sensor 100 will be described.

More particularly, when electrical energy storage device 158 is a battery, energy harvesting may be employed to recharge the battery and thus eliminate the need to replace the battery. Energy harvesting also enables electrical energy storage device 158 to be an energy storage device other than a battery, such as a capacitor, a super-capacitor, and/or an ultra-capacitor. A capacitor, a super-capacitor, and/or an ultra-capacitor, when employed as energy storage device 158, may replace a battery, or be used in combination with a battery. In this manner, second embodiment sensor 170 employs energy harvesting to power or charge any one or a combination of types of energy storage devices 158.

In addition to sensor block 120, second embodiment sensor 170 includes energy harvesting means, such as permanent magnets 172 and a coil 174, which take advantage of the rotation of hub 22 and hub cap 102 relative to axle spindle 14 to generate electricity. More particularly, a plurality of magnets 172, and preferably four magnets, are mounted on a spindle plug 176. Spindle plug 176 includes a cylindrical body 178 that is configured to securely seat in axle counterbore 52. An inboard wall 180 extends perpendicular to cylindrical body 178 from an inboard end 182 of the cylindrical body. Inboard wall 180 preferably is formed with a central opening 184, which enables conduit 44 (FIG. 1) of a tire inflation system to pass through plug 176. A radially-extending flange 186 is formed at an outboard end 188 of cylindrical body 178, and includes an inboard surface 190 that abuts the outboard end of axle spindle 14 when plug 176 is inserted into the spindle. An axially-extending lip 192 is formed at radially outward end 194 of flange 186, and includes a plurality of mounting bosses 196. Each boss 196 is disposed in a uniform, spaced-apart manner about the circumference of lip 192. For example, when four bosses 196 are employed, they are preferably spaced about ninety degrees apart.

A respective one of magnets 172 is mounted on each boss 196 by means such as a fastener, an adhesive, a slip fit, or a slot. In this manner, magnets 172 are statically mounted in a precise location. Because spindle plug 176 is pressed into and securely seats in precisely-formed counterbore 52, the spindle plug and magnets 172 are radially and axially aligned relative to axle spindle 14. The pressed-in configuration of spindle plug 176 is easy to install, and enables any number of magnets 172 to be employed, and preferably between about two and eight magnets. It is to be understood that, while magnets 172 are shown in a flat axial orientation, they may be disposed in an angled orientation, depending on particular design considerations, with coil 174 having an orientation that is parallel to the magnets, as will be described in greater detail below. Optionally, spindle plug 176 may be fanned with a feature (not shown) on radial inside surface of lip 192 that engages a keyway (not shown) formed on axle spindle 14 to prevent rotation of the plug relative to the axle spindle.

Coil 174 preferably is formed of copper or other electrical winding material known in the art, and is formed as a ring and mounted in hub cap 102. More particularly, coil 174 seats adjacent a radially inward surface 198 of hub cap side wall 104, and against an inboard surface of hub cap intermediate wall 106. Coil 174 is formed with two tabs 202 (FIG. 8) that are each disposed in a uniform, spaced-apart manner about the circumference of the coil, and which seat on bosses or standoffs 204 formed in hub cap 102. Coil 174 is secured to hubcap 102 by fasteners 206, which attach tabs 202 to standoffs 204.

Hub cap 102 is precisely radially and axially aligned with hub 22 as described in detail in U.S. Pat. No. 7,731,300, which is owned by the same Assignee as the present invention, Hendrickson USA, L.L.C. Because hub cap 102 is precisely radially and axially aligned with hub 22, and coil 174 is secured in a precise location in the hub cap through the use of tabs 202 and standoffs 204, the coil is in precise radial and axial alignment with the hub. The radial and axial alignment of coil 174 with hub 22 cooperates with the above-described radial and axial alignment of magnets 172 with spindle 14, thereby maintaining the coil and the magnets in parallel close aligned proximity with one another.

During vehicle operation, coil 174 rotates with hub 22, and thus rotates about magnets 172, which remain static with axle spindle 14. As coil 174 rotates about magnets 172, the close proximity of the coil and the magnets enables a current to be produced in the coil. The current is transmitted to electrical energy storage device 158 or other energy storage means by electrical contacts or wireless power transmission (not shown), thereby powering sensor 170. When wireless power transmission is employed, second embodiment sensor 170 includes accompanying power transmission structure. For example, an antenna with microwave array emitters may be electrically connected to coil 174 or magnets 172, which emit a power transmission signal to a receiver that receives the power transmission signal and is electrically connected to electrical energy storage device 158 or other energy storage means, thereby charging the electrical energy storage device and/or powering sensor 170. Of course, other wireless power transmission means known to those skilled in the art may be employed without affecting the overall concept or operation of the invention.

In this manner, second embodiment sensor 170 enables a long-life system by employing energy harvesting to power and/or recharge electrical energy storage device 158, thereby eliminating the need to replace the electrical energy storage device when a battery is employed. By being wireless and employing energy harvesting to power and/or recharge electrical energy storage device 158, sensor 170 is independent from the vehicle power supply. Since sensor 170 is independent from the vehicle power supply, it is not subject to power-related difficulties arising from a connection to the vehicle power supply, and thus is able to continuously operate in a dependable manner while the vehicle is traveling. It is to be understood that other types of configurations for coil 174 and magnets 172 than those shown above may be employed without affecting the overall concept or operation of the invention. In addition, an electrical current may also be generated by coil 174 and magnets 172 through a change of polarity in the magnets, without affecting the overall concept or operation of the invention.

As described above, it is to be understood that second embodiment sensor 170 may also employ energy harvesting to power or charge any one or a combination of types of energy storage devices 158, including a capacitor, a supercapacitor, an ultra-capacitor, and or a battery without affecting the overall concept or operation of the invention. Moreover, as described above, magnets 172 and coil 174 capture rotational energy to provide energy harvesting means for sensor 170. It is to be understood that energy harvesting means other than magnets 172 and coil 174 may be employed without affecting the overall concept or operation of the invention. For example, vibrational or thermal energy harvesting means, as known to those skilled in the art, may be employed.

Figure 9:
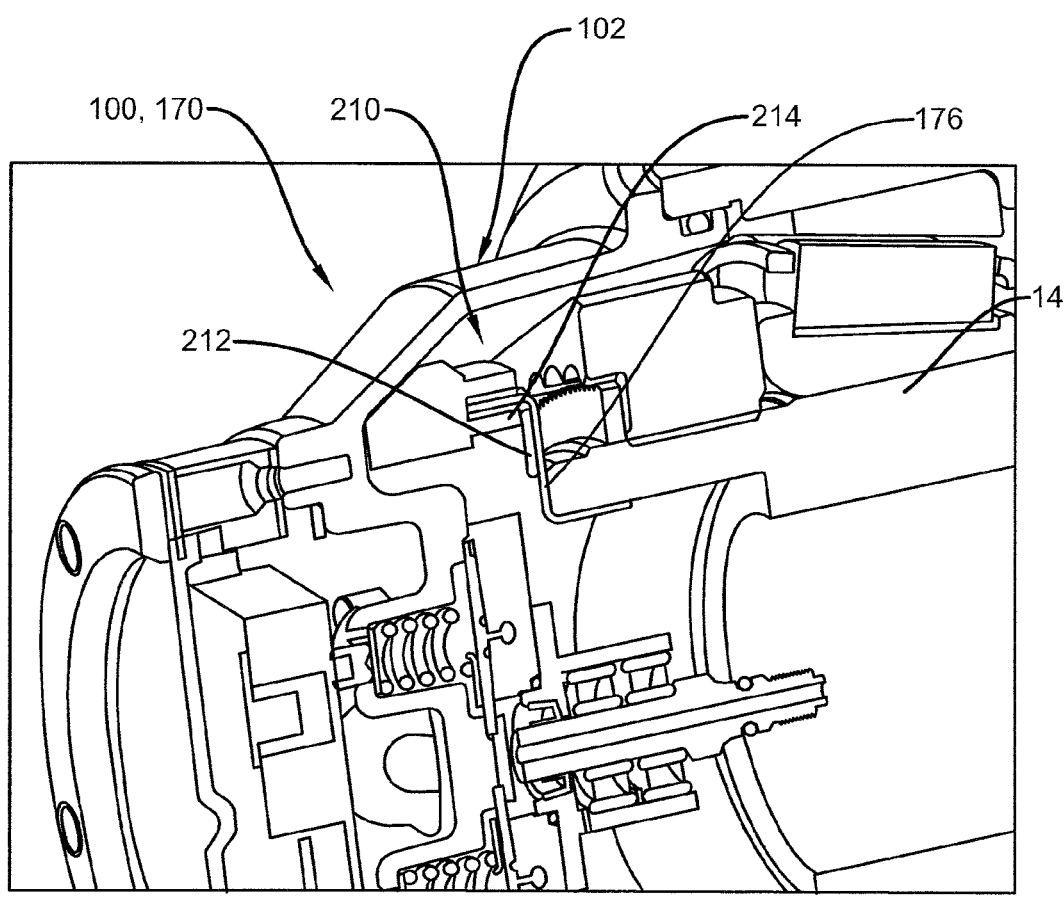
FIG. 9 is a fragmentary cross-sectional perspective view of a first embodiment of an optional ABS sensor system, shown employed with the sensor for a heavy-duty wheel end assembly of the present invention.
Figure 10:
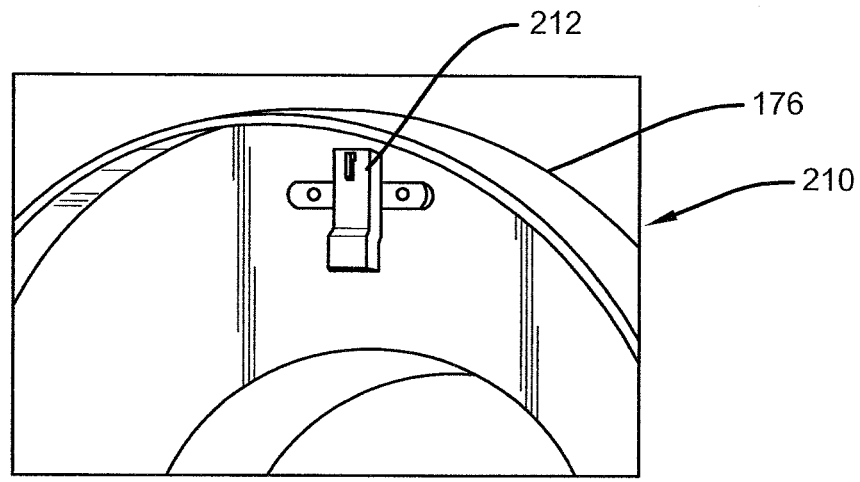
FIG. 10 is a fragmentary view from an outboard end of the ABS sensor system shown in FIG. 9.
Figure 11:
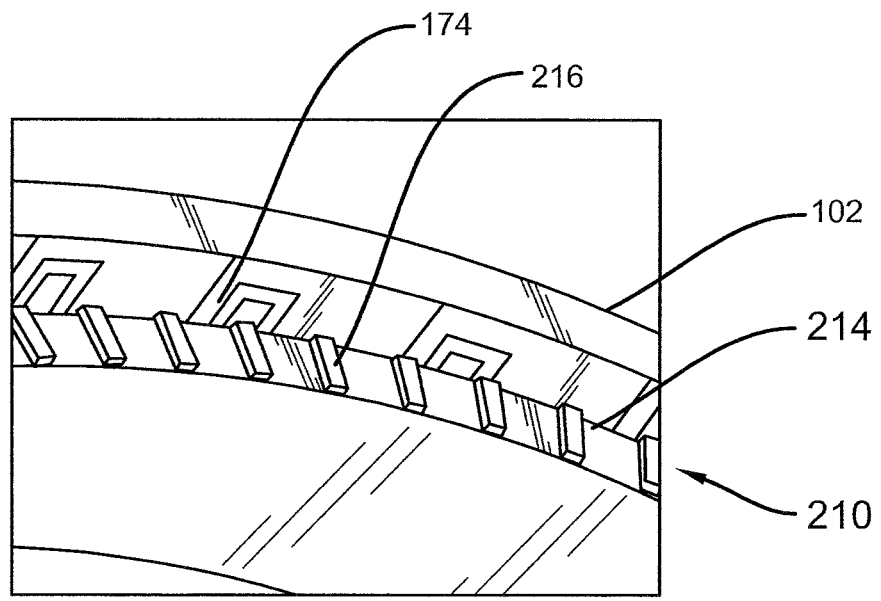
FIG. 11 is a fragmentary view from an inboard end of the ring of the ABS sensor system shown in FIG. 9.

As is known in the art, components of an anti-lock braking system (ABS) typically are mounted on or incorporated into wheel end assembly 12. Such ABS systems include a tone ring (not shown) that includes teeth, and a sensor (not shown). Either the tone ring or the sensor is mounted on hub 22 and rotates with the hub, while the other of the tone ring and the sensor is statically mounted, which enables the sensor to monitor the tone ring teeth to indicate the direction of wheel rotation and wheel speed. FIGS. 9-11 show a first embodiment of an optional ABS sensor system, indicated generally at 210, which may be employed with first embodiment sensor 100 or second embodiment sensor 170 of the present invention. ABS sensor system 210 may be used as a redundant ABS sensor system, or it may be used to replace a traditional tone ring and sensor to reduce the cost and/or weight of the system.

More particularly, ABS sensor system 210 includes a sensor 212 that is mounted on spindle plug 176 in an axially outboardly facing direction. A ring 214, which may include coil 174, is mounted in hub cap 102, and is formed with teeth 216 facing in an axially inboard direction. Because of the above-described alignment of hub cap 102 with hub 22 and the above-described alignment of spindle plug 176 with axle spindle 14, ring 214 and sensor 212 are maintained in closed aligned proximity with one another. In this manner, sensor 212 senses teeth 216 to monitor the teeth and indicate the direction of wheel rotation and wheel speed.

Figure 12:
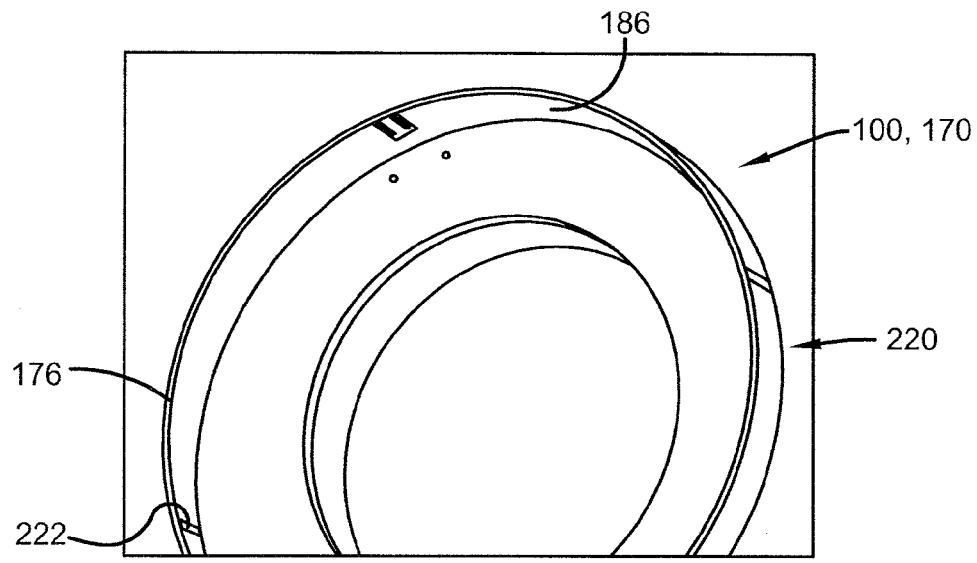
FIG. 12 is a fragmentary view from an outboard end of a sensor of a second embodiment of an optional ABS sensor system, shown employed with the sensor for a heavy-duty wheel end assembly of the present invention.
Figure 13:
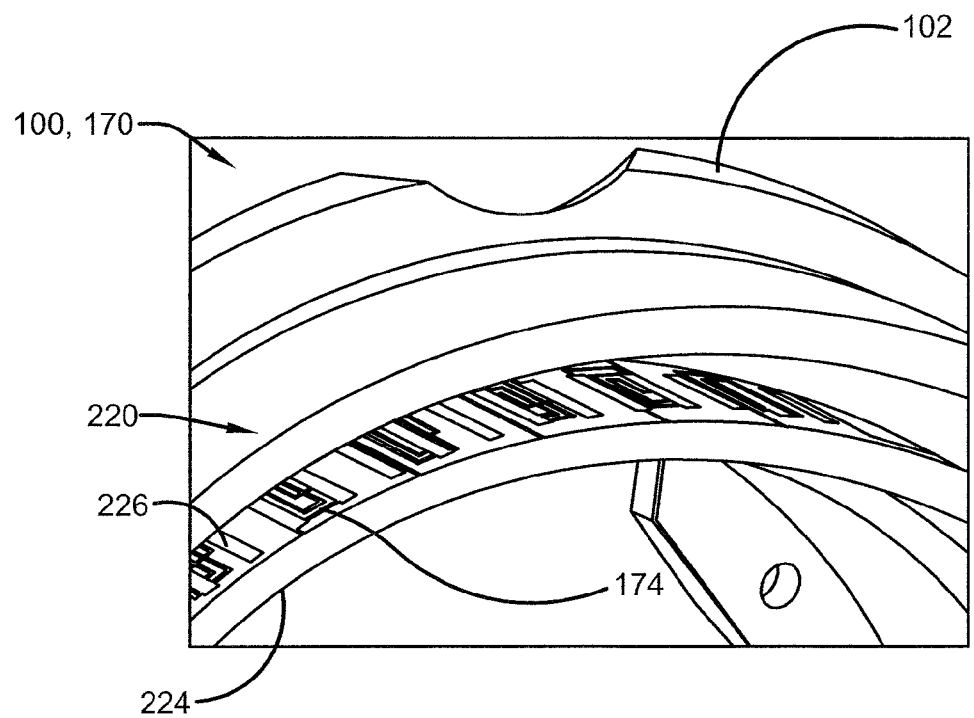
FIG. 13 is a fragmentary view from an inboard end of a ring of the second embodiment optional ABS sensor system, shown employed with the sensor for a heavy-duty wheel end assembly of the present invention.

FIGS. 12-13 show a second embodiment of an optional ABS sensor system, indicated generally at 220, which may be employed with first embodiment sensor 100 or second embodiment sensor 170 of the present invention. Second embodiment ABS sensor 220 is similar to first embodiment ABS sensor 210, with the primary difference being axial alignment of sensor 212 with ring teeth 216 in the first embodiment ABS sensor system, while the second embodiment ABS sensor system employs radial alignment.

More particularly, second embodiment ABS sensor system 220 includes a sensor 222 that is mounted on spindle plug 176 in a radially inward facing direction. A ring 224, which may include coil 174 (FIG. 6), is mounted in hub cap 102 (FIG. 6), and is formed with teeth 226 facing in a radially outward direction. It is to be understood that, in second embodiment ABS sensor system 220, flange 186 of spindle plug 176 is disposed radially outwardly of coil 174. Because of the above-described alignment of hub cap 102 with hub 22 and the above-described alignment of spindle plug 176 with axle spindle 14, ring 224 and sensor 222 are maintained in closed aligned proximity with one another. In this manner, sensor 222 senses teeth 226 to monitor the teeth and indicate the direction of wheel rotation and wheel speed.

Figure 14:
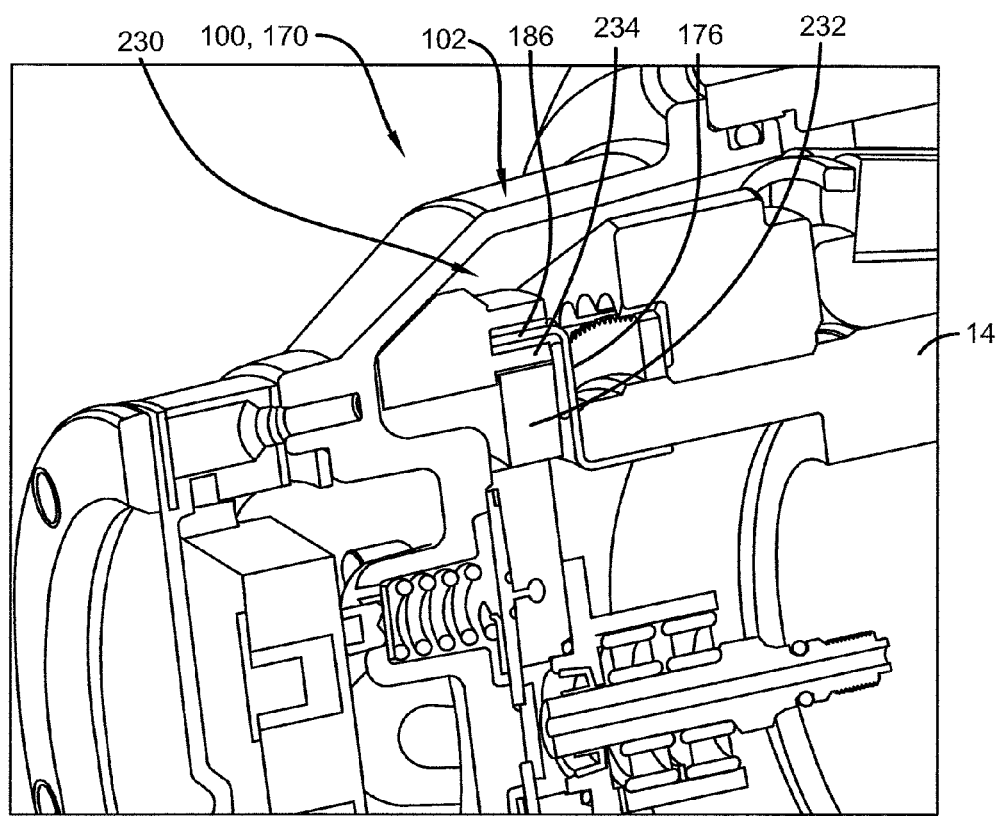
FIG. 14 is a fragmentary cross-sectional perspective view of a third embodiment of an optional ABS sensor system, shown employed with the sensor for a heavy-duty wheel end assembly of the present invention.
Figure 15:
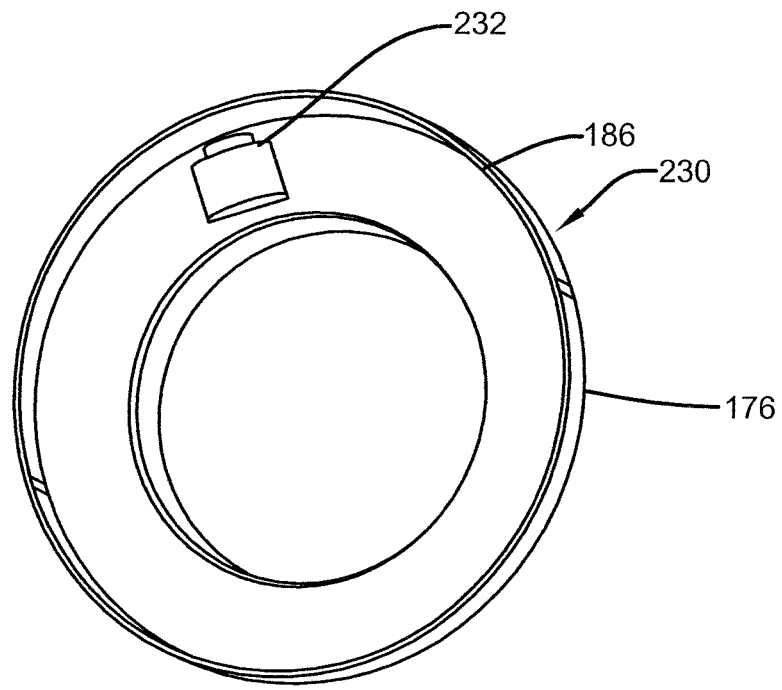
FIG. 15 is a view from an outboard end of the sensor of the ABS sensor system shown in FIG. 14.
Figure 16:
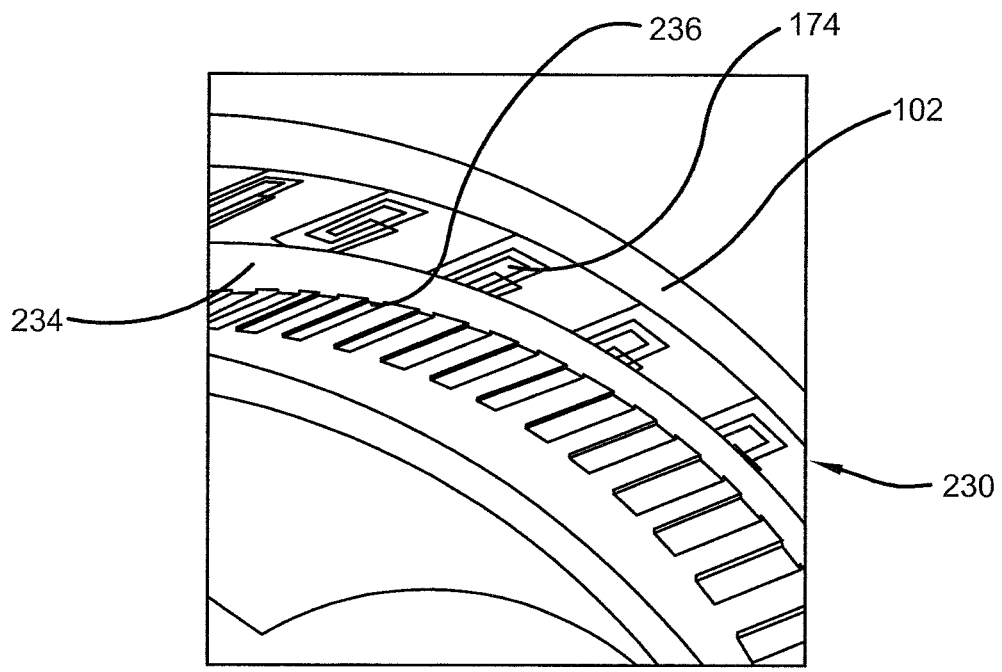
FIG. 16 is a fragmentary view from an inboard end of the ring of the ABS sensor system shown in FIG. 14.

FIGS. 14-16 show a third embodiment of an optional ABS sensor system, indicated generally at 230, which may be employed with first embodiment sensor 100 or second embodiment sensor 170 of the present invention. Third embodiment ABS sensor 230 is similar to second embodiment ABS sensor 220, with the primary difference being the disposition of flange 186 of spindle plug 176 radially inwardly of coil 174 in the third embodiment ABS sensor, while the second embodiment ABS sensor includes the flange of the spindle plug being disposed radially outwardly of the coil.

More particularly, third embodiment ABS sensor system 230 includes a sensor 232 that is mounted on spindle plug 176 in a radially outward facing direction. A ring 234, which may include coil 174, is mounted in hub cap 102 and is formed with teeth 236 facing in a radially inward direction. Because of the above-described alignment of hub cap 102 with hub 22 and the above-described alignment of spindle plug 176 with axle spindle 14, ring 234 and sensor 232 are maintained in closed aligned proximity with one another. In this manner, sensor 232 senses teeth 236 to monitor the teeth and indicate the direction of wheel rotation and wheel speed.

In this manner, sensor 100, 170 of the present invention thus provides a wireless sensor for wheel end assembly 12 of a heavy-duty vehicle. By being wireless and employing electrical energy storage device 158 and/or energy harvesting for power, sensor 100, 170 is independent from the vehicle power supply. Since sensor 100, 170 is independent from the vehicle power supply, it is not subject to power-related difficulties arising from a connection to the vehicle power supply, and thus is able to continuously operate in a dependable manner while the vehicle is traveling.

Sensor 100, 170 is mounted in hub cap 102 of wheel end assembly 12, and by being disposed in a protected environment, is not subject to harsh environmental conditions, such as road debris and corrosive anti-icing chemicals. Sensor 100, 170 also reduces potential damage from handling during disassembly and reassembly of wheel end assembly 12 for servicing. In addition, by being mounted in hub cap 102, sensor 100, 170 is tamper resistant. Because sensor 100, 170 is mounted in sensor block 120 adjacent removable outboard wall 118 of hub cap 102, the sensor is easily accessed for adjustment, repair, and/or replacement, without substantially opening wheel end assembly 12, which desirably minimizes both the ability of contaminants to enter the wheel end assembly and the potential for improper re-installation of components.

Sensor 100, 170 includes effective means for communicating or transmitting data that is sensed, such as R/F transmission and/or LED indicators 164, which are disposed in the protected environment of hub cap 102 adjacent transparent or translucent outboard wall 118. Moreover, through the use of sensor block 120, sensor 100, 170 accommodates components of tire inflation system 146, as adequate space remains in hub cap intermediate wall 106, hub cap side wall 104, and hub cap compartment 116 for the mounting of components of the tire inflation system 146.

Second embodiment sensor 170 employs energy harvesting to power or recharge electrical energy storage device 158, thereby eliminating the need to replace the device when a battery is employed. The structure of sensor 100, 170 of the present invention also enables the use of an optional ABS sensor system 210, 220, 230. Optional ABS sensor system 210, 220, 230 may be used as a redundant ABS sensor system, or it may be used to replace a traditional tone ring and sensor to reduce the cost and/or weight of the system.

The present invention also includes a method for sensing operational conditions in a wheel end assembly for a heavy-duty vehicle. The method includes steps in accordance with the description that is presented above and shown in FIGS. 2-16.

It is to be understood that the structure of the above-described sensor for a wheel end assembly for a heavy-duty vehicle may be altered or rearranged, or certain components omitted or added, without affecting the overall concept or operation of the invention. It is also to be understood that the present invention finds application in all types of axle spindle and wheel end assemblies known to those skilled in the art, including other types of axle spindles and wheel end assemblies than those shown and described herein and known to those skilled in the art, without affecting the concept or operation of the invention. Moreover, it is to be understood that the present invention finds application in all types of hub caps known to those skilled in the art, including other types of hub caps than those shown and described herein and known to those skilled in the art, without affecting the concept or operation of the invention. While reference herein has been made generally to a heavy-duty vehicle for the purpose of convenience, it has been with the understanding that such reference includes trucks, tractor-trailers or semi-trailers, and trailers thereof.

Accordingly, the sensor for a wheel end assembly for a heavy-duty vehicle of the present invention is simplified, provides an effective, safe, inexpensive, and efficient structure which achieves all the enumerated objectives, provides for eliminating difficulties encountered with prior art sensors, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the sensor for a wheel end assembly for a heavy-duty vehicle of the present invention is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A sensor for a wheel end assembly of a heavy-duty vehicle, said wheel end assembly including a wheel hub and a hub cap removably mounted on said wheel hub, said sensor comprising:
    mounting means disposed in said hub cap, said hub cap being mounted on an outboard end of said wheel hub to prevent leakage of lubricant from the wheel hub and to prevent contaminants from entering said wheel hub;
    sensing means mounted on said mounting means to sense at least one operational condition of said vehicle;
    a processor mounted on said mounting means and electrically connected to said sensing means to process data from said sensing means;
    communication means mounted on said mounting means and electrically connected to said processor to communicate said processed data to a user; and
    an electrical energy storage device mounted on said mounting means and electrically connected to said sensing means, said processor and said communication means to power said sensor.

2. The sensor for a wheel end assembly of a heavy-duty vehicle of claim 1, wherein said mounting means includes a sensor block.

3. The sensor for a wheel end assembly of a heavy-duty vehicle of claim 2, wherein: said hub cap includes:
    a cylindrical side wall;
    an intermediate wall disposed between an inboard end of said side wall and an outboard end of the side wall, said intermediate wall extending generally perpendicular to said side wall; and
    an outboard wall extending generally perpendicular to said side wall; and
    said sensor block is disposed between said hub cap intermediate wall and said hub cap outboard wall.

4. The sensor for a wheel end assembly of a heavy-duty vehicle of claim 2, wherein said sensing means includes sensor instrumentation, and sensor instrumentation and said processor are mounted on a main circuit board.

5. The sensor for a wheel end assembly of a heavy-duty vehicle of claim 4, wherein said sensor block includes a perimeter ring and a component mounting block disposed inside of said perimeter ring, said component mounting block being formed with a plurality recesses for receiving said main circuit board, said communication means, and said electrical energy storage device.

6. The sensor for a wheel end assembly of a heavy-duty vehicle of claim 1, wherein said communication means includes a radio frequency circuit board.

7. The sensor for a wheel end assembly of a heavy-duty vehicle of claim 6, wherein an outboard wall of said hub cap is at least one of transparent and translucent, whereby radio signals from said radio frequency circuit board pass through said outboard wall.

8. The sensor for a wheel end assembly of a heavy-duty vehicle of claim 6, wherein said radio frequency circuit board communicates emergency conditions to a receiver that is visible to an operator of said vehicle.

9. The sensor for a wheel end assembly of a heavy-duty vehicle of claim 6, wherein said radio frequency circuit board communicates said processed data to a remote receiver for central collection and analysis.

10. The sensor for a wheel end assembly of a heavy-duty vehicle of claim 1, wherein said communication means includes light emitting diode indicators.

11. The sensor for a wheel end assembly of a heavy-duty vehicle of claim 10, wherein an outboard wall of said hub cap is at least one of transparent and translucent, whereby said light emitting diode indicators are visible through said outboard wall.

12. The sensor for a wheel end assembly of a heavy-duty vehicle of claim 1, wherein said communication means includes an audible alert.

13. The sensor for a wheel end assembly of a heavy-duty vehicle of claim 1, wherein said mounting means are formed with slots to enable lubricant in said wheel end assembly to circulate through said hub cap.

14. The sensor for a wheel end assembly of a heavy-duty vehicle of claim 1, wherein said electrical energy storage device is independent from a power supply of said vehicle.

15. The sensor for a wheel end assembly of a heavy-duty vehicle of claim 1, wherein said electrical energy storage device includes at least one of a battery, a capacitor, a super-capacitor, and an ultra-capacitor.

16. The sensor for a wheel end assembly of a heavy-duty vehicle of claim 1, wherein said electrical energy storage device is charged by energy harvesting.

17. The sensor for a wheel end assembly of a heavy-duty vehicle of claim 16, further comprising:
    a plurality of magnets mounted on a spindle plug;
    said spindle plug being seated in a counterbore of an axle; and
    a coil of electrical winding material being formed as a ring and mounted in said hub cap in proximity to said magnets, whereby during vehicle travel, said coil rotates with said wheel hub about said magnets to produce an electrical current that is transmitted to said electrical energy storage device.

18. The sensor for a wheel end assembly of a heavy-duty vehicle of claim 17, wherein said transmission of said electrical current to said electrical energy storage device is by wireless transmission.

19. The sensor for a wheel end assembly of a heavy-duty vehicle of claim 1, wherein said operational conditions of said vehicle includes at least one of a temperature in said wheel end assembly, vibration in the wheel end assembly, humidity in said wheel end assembly, a speed of a wheel of said vehicle, a direction of a wheel of said vehicle, and a revolution count of said wheel hub.

20. The sensor for a wheel end assembly of a heavy-duty vehicle of claim 19, wherein said vibration sensing includes overall detection of a high-frequency band for a broad spectrum review.

21. The sensor for a wheel end assembly of a heavy-duty vehicle of claim 1, wherein said sensor accommodates components of a tire inflation system in said hub cab.

22. The sensor for a wheel end assembly of a heavy-duty vehicle of claim 1, further comprising an anti-lock braking system sensor.

23. The sensor for a wheel end assembly of a heavy-duty vehicle of claim 22, wherein said anti-lock braking system sensor includes:
    a sensor unit mounted on a spindle plug that is seated in a counterbore of an axle, said sensor unit mounted in an axially outboardly facing direction; and
    a ring formed with a plurality of teeth, said teeth facing in an axially inboard direction, whereby said sensor unit senses the teeth to indicate a direction of rotation and speed of a wheel of said vehicle.

24. The sensor for a wheel end assembly of a heavy-duty vehicle of claim 22, wherein said anti-lock braking system sensor includes:
    a sensor unit mounted on a spindle plug that is seated in a counterbore of an axle, said sensor unit mounted in a radially inward facing direction; and
    a ring formed with a plurality of teeth, said teeth facing in a radially outward direction, whereby said sensor unit senses the teeth to indicate a direction of rotation and speed of a wheel of said vehicle.

25. The sensor for a wheel end assembly of a heavy-duty vehicle of claim 22, wherein said anti-lock braking system sensor includes:
    a sensor unit mounted on a spindle plug that is seated in a counterbore of an axle, said sensor unit mounted in a radially outward facing direction;
    a ring formed with a plurality of teeth, said teeth facing in a radially inward direction, whereby said sensor unit senses the teeth to indicate a direction of rotation and speed of a wheel of said vehicle.

* * * * *

UNITED STATES PATENT AND TRADEMARK OFFICE
CERTIFICATE OF CORRECTION

| | |
|---|---|
| PATENT NO. | : 9,933,337 B2 |
| APPLICATION NO. | : 14/851080 |
| DATED | : April 3, 2018 |
| INVENTOR(S) | : White et al. |

Page 1 of 1

It is certified that error appears in the above-identified patent and that said Letters Patent is hereby corrected as shown below:

On the Title Page

Item (73) Assignee: delete the word "Hendrikson" and insert therefore the word --Hendrickson--.

Signed and Sealed this
Second Day of October, 2018

Andrei Iancu
*Director of the United States Patent and Trademark Office*